United States Patent
Davis

(10) Patent No.: US 9,982,550 B2
(45) Date of Patent: May 29, 2018

(54) JOINED TWO PLY W SEAL

(71) Applicant: UNITED TECHNOLOGIES CORPORATION, Farmington, CT (US)

(72) Inventor: Timothy M. Davis, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 167 days.

(21) Appl. No.: 15/171,942

(22) Filed: Jun. 2, 2016

(65) Prior Publication Data

US 2017/0350266 A1    Dec. 7, 2017

(51) Int. Cl.
*F01D 11/00* (2006.01)
*F16J 15/44* (2006.01)
*F16J 15/36* (2006.01)

(52) U.S. Cl.
CPC ........... *F01D 11/006* (2013.01); *F16J 15/363* (2013.01); *F16J 15/441* (2013.01)

(58) Field of Classification Search
CPC .......... F16J 15/00; F16J 15/027; F16J 15/022; F16J 15/02; F16J 15/0887; F16J 9/18; F01D 11/005; F01D 11/08; F01D 11/00; F05D 2240/55; F05D 2240/57; F05D 2240/59
USPC ....... 277/491; 415/134–136, 138–139, 214.1
See application file for complete search history.

(56) References Cited

U.S. PATENT DOCUMENTS

| | | | | |
|---|---|---|---|---|
| 1,151,112 A | * | 8/1915 | Magarrell | F16J 9/14 277/497 |
| 1,357,392 A | * | 11/1920 | Fuchs, Jr. | F16J 9/16 277/446 |
| 4,052,077 A | * | 10/1977 | MacArthur | B21D 53/18 277/575 |
| 4,589,666 A | * | 5/1986 | Halling | F16J 15/0887 277/631 |
| 4,602,795 A | * | 7/1986 | Lillibridge | F16J 9/18 277/644 |
| 4,602,888 A | * | 7/1986 | Court | F16J 15/0887 267/1.5 |
| 4,759,555 A | * | 7/1988 | Halling | F16J 9/18 277/631 |
| 4,917,391 A | | 4/1990 | Shelinbarger, Jr. et al. | |
| 5,249,814 A | * | 10/1993 | Halling | F16J 15/0887 228/214 |
| 5,630,593 A | * | 5/1997 | Swensen | F16J 15/0887 277/626 |
| 6,199,871 B1 | * | 3/2001 | Lampes | F01D 11/005 277/614 |
| 6,237,921 B1 | * | 5/2001 | Liotta | F16J 15/0887 277/630 |

(Continued)

FOREIGN PATENT DOCUMENTS

| | | |
|---|---|---|
| EP | 1 177 367 | 2/2002 |
| WO | 0012920 | 3/2000 |

OTHER PUBLICATIONS

EP Search Report dated Oct. 30, 2017 in EP Application No. 17174058.2.

*Primary Examiner* — Kristina R Fulton
*Assistant Examiner* — L. Susmitha Koneru

(57) ABSTRACT

A metal gasket bellows seal includes a first ply and a second ply coupled to the first ply at a first location via spot joining at one or more locations.

15 Claims, 10 Drawing Sheets

(56) References Cited

U.S. PATENT DOCUMENTS

| | | | | |
|---|---|---|---|---|
| 6,299,178 | B1* | 10/2001 | Halling | F16J 15/0887 |
| | | | | 277/644 |
| 6,352,267 | B1* | 3/2002 | Rode | F16J 15/0887 |
| | | | | 277/631 |
| 6,386,551 | B1* | 5/2002 | Martin | B29C 43/56 |
| | | | | 277/634 |
| 6,659,472 | B2* | 12/2003 | Aksit | F01D 11/003 |
| | | | | 277/647 |
| 6,932,353 | B2* | 8/2005 | Amos | F16J 15/008 |
| | | | | 277/602 |
| 7,121,790 | B2 | 10/2006 | Fokine et al. | |
| 7,152,864 | B2* | 12/2006 | Amos | F01D 11/005 |
| | | | | 277/650 |
| 7,476,075 | B2* | 1/2009 | Geldenhuys | F04D 29/167 |
| | | | | 277/634 |
| 7,497,443 | B1* | 3/2009 | Steinetz | F16J 15/0887 |
| | | | | 277/644 |
| 8,974,891 | B2* | 3/2015 | Riedell | B32B 18/00 |
| | | | | 156/289 |
| 2004/0239053 | A1 | 12/2004 | Rowe | |
| 2009/0114281 | A1* | 5/2009 | Gobel | F24J 2/14 |
| | | | | 136/259 |
| 2012/0195743 | A1* | 8/2012 | Walunj | F01D 11/006 |
| | | | | 415/174.5 |

* cited by examiner

JOINED TWO PLY W SEAL

FIELD

The present disclosure is directed to a gasket seal and, more particularly, to a seal for use in a turbine section of a gas turbine engine.

BACKGROUND

Gas turbine engines, such as those that power modern commercial and military aircraft, may include a fan section to propel the aircraft, a compressor section to pressurize a supply of air from the fan section, a combustor section to burn fuel in the presence of the pressurized air, and a turbine section to extract energy from the resultant combustion gases and to generate thrust.

The compressor section and turbine section each have multiple stages of rotors that rotate about a central axis and multiple stages of stators that are stationary relative to the central axis. It is desirable to reduce fluid leakage between the stages of rotors and stators. Bellows seals, also referred to as "w-seals," are frequently used to reduce fluid leakage between the stages of rotors and stators.

Bellows seals may include a first ply and a second ply adjacent to the first ply. It may be desirable to reduce the likelihood of the first ply separating from the second ply during use of the bellows seals. Stated differently, it may be desirable to reduce the likelihood of the first ply moving relative to the second ply at a location away from an area of intentional slip (also referred to as a slip joint). Furthermore, the bellows seals may be manufactured at a facility remote from where the gas turbine engine will be assembled.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Disclosed herein is a metal gasket bellows seal. The metal gasket bellows seal includes a first ply and a second ply coupled to the first ply at a first location via spot joining.

In any of the foregoing metal gasket bellows seals, the second ply may be coupled to the first ply at multiple locations.

Any of the foregoing metal gasket bellows seals may also include a slip joint and wherein the first location may be positioned between 150 degrees and 210 degrees from the slip joint.

In any of the foregoing metal gasket bellows seals, the spot joining may include at least one of at least one of resistance welding, laser welding or electron beam welding.

Any of the foregoing metal gasket bellows seals may also include adhesive coupled to the first ply and the second ply at the slip joint.

In any of the foregoing metal gasket bellows seals, the first location may be positioned on a first leg of the metal gasket bellows seal.

In any of the foregoing metal gasket bellows seals, the first location may be positioned between an inner diameter edge of the metal gasket bellows seal and an outer diameter edge of the metal gasket bellows seal.

In any of the foregoing metal gasket bellows seals, the first location may be positioned a first distance from the outer diameter edge of the metal gasket bellows seal that is between 40 percent and 60 percent of a second distance from the outer diameter edge of the metal gasket bellows seal to the inner diameter edge of the metal gasket bellows seal.

Also described is a metal gasket bellows seal. The metal gasket bellows seal includes a first ply having a first ply first end and a first ply second end separated by a first distance. The metal gasket bellows seal also includes a second ply having a second ply first end and a second ply second end separated by a second distance such that a slip joint formed by an overlap of the first ply first end and the second ply second end. The metal gasket bellows seal also includes adhesive coupled to the first ply and the second ply at the slip joint to resist movement of the first ply relative to the second ply.

In any of the foregoing metal gasket bellows seals, the adhesive may be located at an outer diameter edge of the metal gasket bellows seal or at an inner diameter edge of the metal gasket bellows seal.

In any of the foregoing metal gasket bellows seals, the adhesive may be configured to melt at a melting temperature that is less than an operating temperature of an environment of the metal gasket bellows seal.

In any of the foregoing metal gasket bellows seals, the operating temperature of the environment of the metal gasket bellows seal may be between 800 degrees Fahrenheit and 1500 degrees Fahrenheit and the melting temperature may be between 400 degrees Fahrenheit and 600 degrees Fahrenheit.

In any of the foregoing metal gasket bellows seals, the adhesive may resist an increase or decrease in a diameter of the metal gasket bellows seal during at least one of transportation or handling of the metal gasket bellows seal.

In any of the foregoing metal gasket bellows seals, the adhesive may be applied to the metal gasket bellows seal at multiple locations.

In any of the foregoing metal gasket bellows seals, the second ply may be coupled to the first ply at a first location away from the slip joint via at least one of resistance welding, laser welding or electron beam welding.

Also described is a method for manufacturing a gas turbine engine. The method includes forming a metal gasket bellows seal that includes a first ply, a second ply, and a slip joint. The method also includes attaching the first ply to the second ply at the slip joint via adhesive. The method also includes transporting the metal gasket bellows seal to a location for assembly of the gas turbine engine. The method also includes assembling the metal gasket bellows seal on the gas turbine engine.

In any of the foregoing methods, the adhesive may be configured to melt at a melting temperature that is less than an operating temperature of an environment of the metal gasket bellows seal.

Any of the foregoing methods may also include performing a green run of the gas turbine engine to melt the adhesive.

In any of the foregoing methods, the adhesive may resist an increase or a decrease of a diameter of the metal gasket bellows seal during the transporting the metal gasket bellows seal to the location for assembly of the gas turbine engine.

In any of the foregoing methods, the adhesive may be located at an outer diameter edge of the metal gasket bellows seal or at an inner diameter edge of the metal gasket bellows seal.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
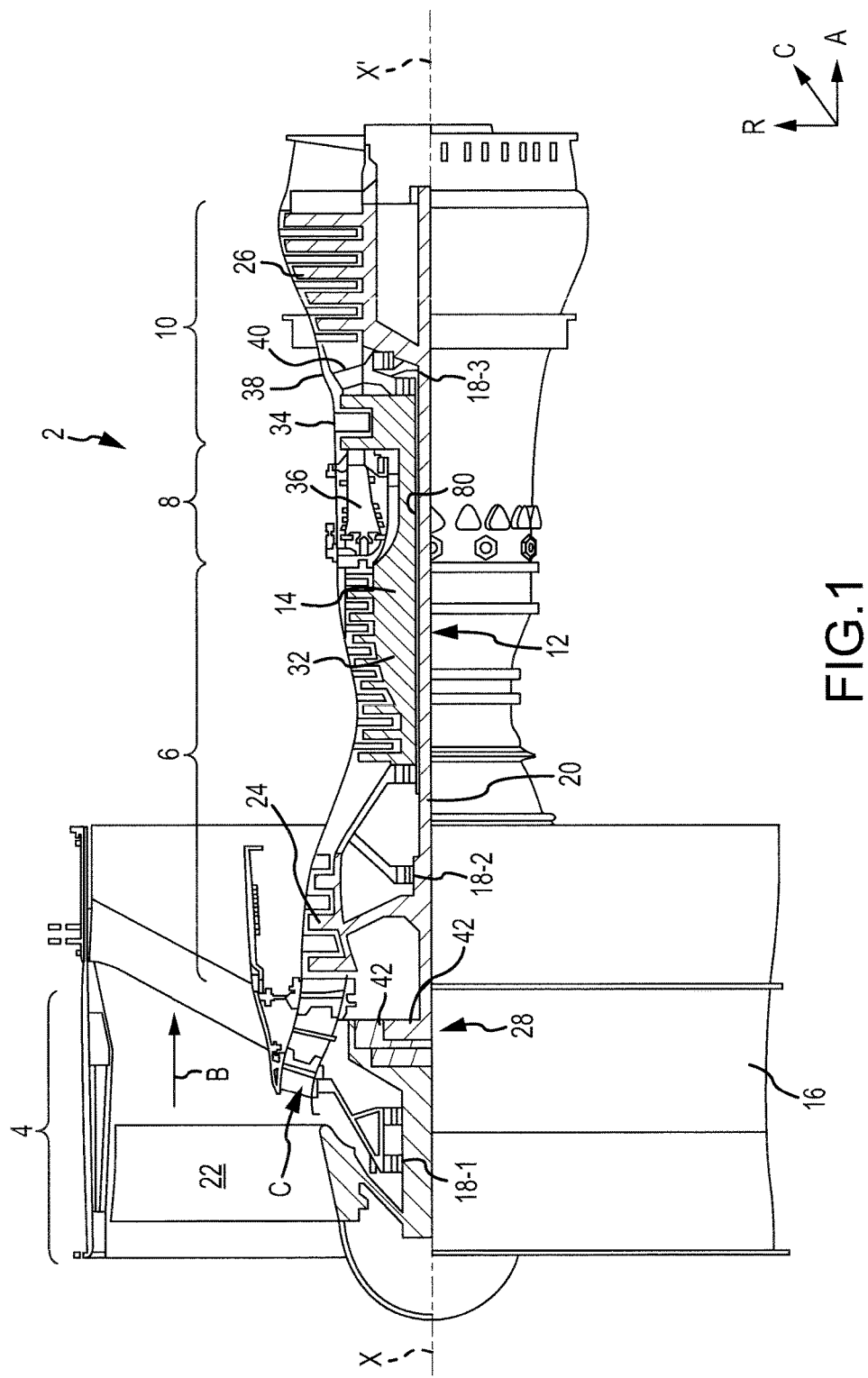
FIG. 1 is a schematic cross-section of a gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. An A-R-C axis is shown throughout the drawings to illustrate the axial, radial and circumferential directions.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path b while compressor section 6 can drive air along a core flow-path c for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbine sections 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly greater than that of the low pressure compressor section 24, and the low pressure turbine section 26 may have a pressure ratio that is greater than about 5:1. The pressure ratio of low pressure turbine section 26 may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal and mechanical loads that are higher than thermal and mechanical loads conventionally encountered, which may shorten the operational life of current components. In various embodiments, operating conditions in high pressure compressor section 32 may be approximately 1400 degrees Fahrenheit (1400° F., approximately 760° C.) or more, and operating conditions in combustor 36 may also be significantly higher.

In various embodiments, combustor section 8 may comprise one or more combustor 36. As mentioned, the core airflow c may be compressed, then mixed with fuel and ignited in the combustor 36 to produce high speed exhaust gases.

Figure 2:
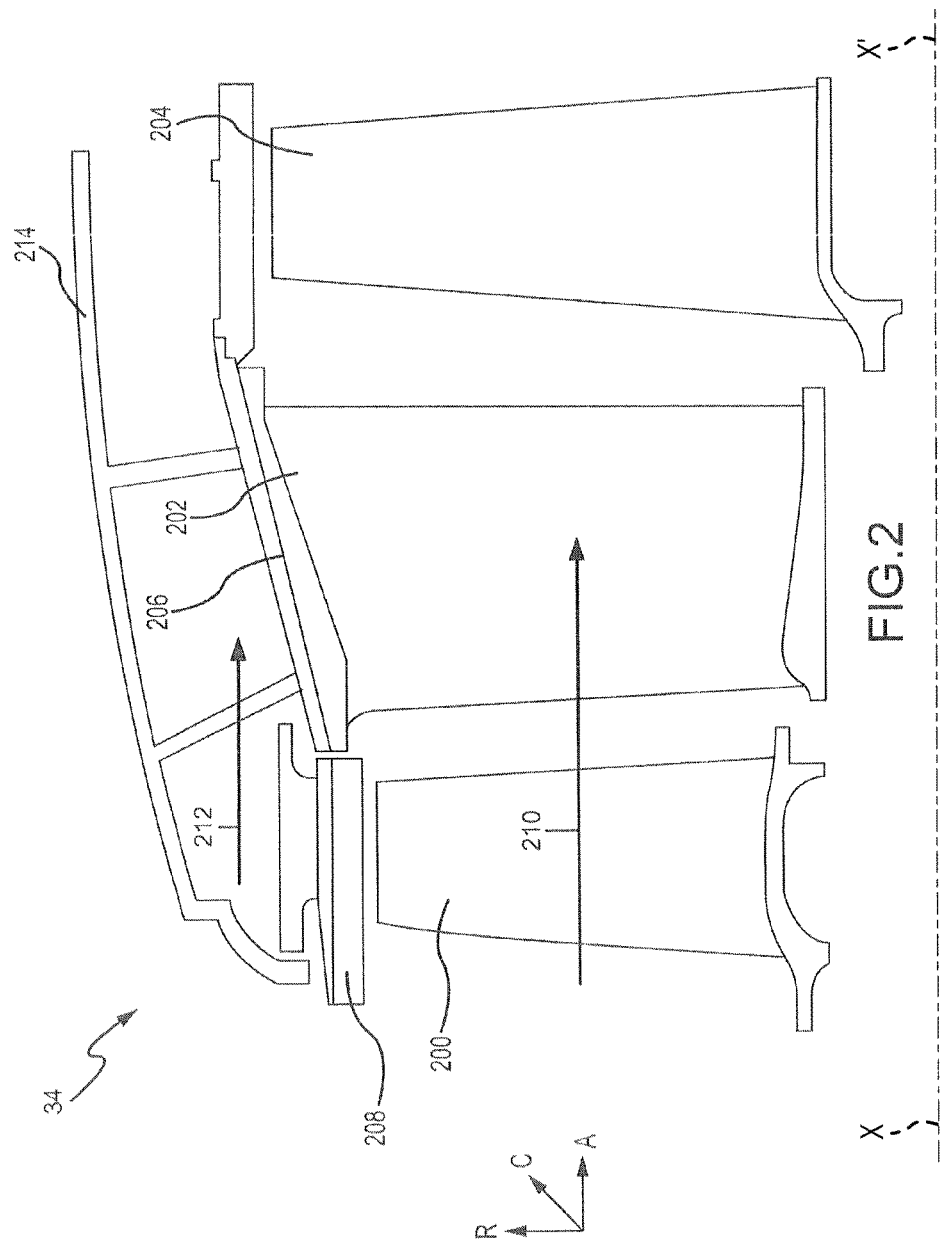
FIG. 2 is an enlarged schematic cross-section of a high pressure turbine section of the gas turbine engine of FIG. 1, in accordance with various embodiments.

With reference now to FIGS. 1 and 2, a portion of high pressure turbine section 34 includes a first rotor blade 200, a vane 202, and a second rotor blade 204. First rotor blade 200 and second rotor blade 204 are each configured to rotate about axis X-X' relative to vane 202 in response to receiving a flow of fluid from combustor section 8. This flow of fluid may be referred to as a gas path and is designated by an arrow 210.

Torque is generated by rotation of first rotor blade 200 and second rotor blade 204 in response to first rotor blade 200 and second rotor blade 204 receiving the flow of fluid. Vane 202 is coupled to a frame 214 of high pressure turbine section 34 and conditions the flow of fluid between first rotor blade 200 and second rotor blade 204. Vane 202 is thus a stator and does not rotate relative to axis X-X'. Each of first rotor blade 200, vane 202, and second rotor blade 204 may be considered a stage of high pressure turbine section 34.

High pressure turbine section 34 also includes a blade outer air seal (BOAS) 208. BOAS 208 is positioned radially outward from first rotor blade 200 and reduces an amount of fluid that may flow at a location radially outward from first rotor blade 200, thus reducing fluid leakage and, in turn, increasing performance of gas turbine engine 2. Vane 202 also includes an outer diameter platform 206. Outer diameter platform 206 may be coupled to frame 214 and may be integral with, or coupled to, vane 202. In that regard, when vane 202 is referenced herein, it may also refer to outer diameter platform 206. Outer diameter platform 206 may resist movement of vane 202 relative to frame 214.

Pressurized air, designated by an arrow 212, is commonly diverted from combustor section 8 and/or compressor section 24 and is used to cool components within high pressure turbine section 34. Fluid in the gas path may have a greater temperature than the pressurized air designated by arrow 212. Thus, the pressurized air designated by arrow 212 may be referred to as a cooling flow.

It may be desirable to reduce an amount of fluid that leaks from the gas path between each stage of high pressure turbine section 34 as fluid leakage may reduce performance. Furthermore, it may be undesirable for the hot fluid from the gas path to contact frame 214 or mix with cooling flow 212. Thus, well-sealed gaps between axially-adjacent components, such as between BOAS 208 and vane 202, increase performance aspects of gas turbine engine 2, such as efficiency, and may increase the lifespan of gas turbine engine 2.

Figure 3:
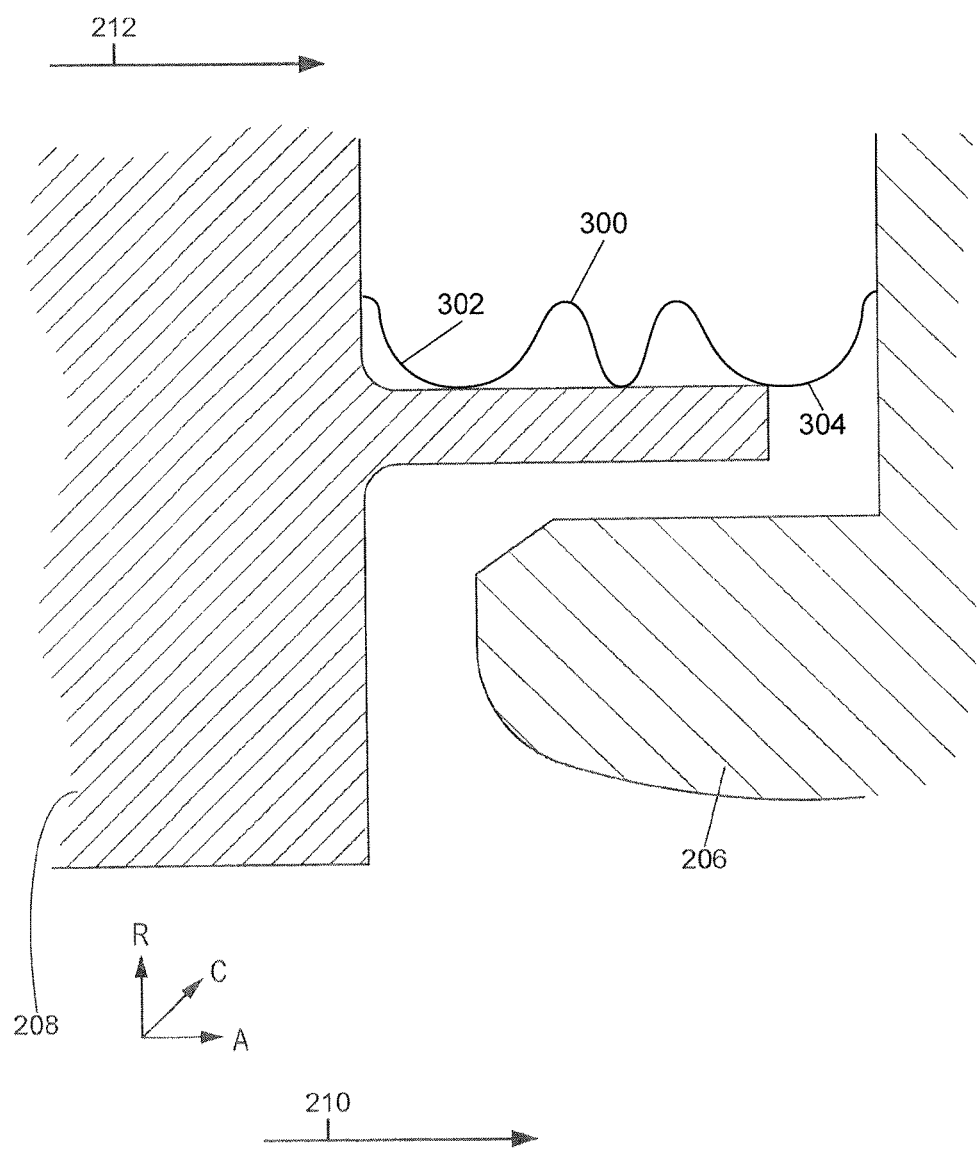
FIG. 3 is an enlarged view of the turbine section shown in FIG. 2 illustrating a blade outer air seal, a vane, and a metal gasket bellows seal, in accordance with various embodiments.

Referring to FIGS. 2 and 3, high pressure turbine section 34 may include a metal gasket bellows seal, or "W seal," 300 extending axially between BOAS 208 and vane 202. Metal gasket bellows seal 300 may extend circumferentially about high pressure turbine section 34 and may thus be an annular structure. Metal gasket bellows seal 300 has a first side 302 and a second side 304. First side 302 faces radially outward relative to vane 202 and second side 304 faces radially inward relative to vane 202. First side 302 may be exposed to the cooling flow, designated by arrow 212, and second side 304 may be exposed to the gas path flow, designated by arrow 210. Thus, second side 304 may be exposed to greater temperatures and pressures than first side 302.

Figure 4:
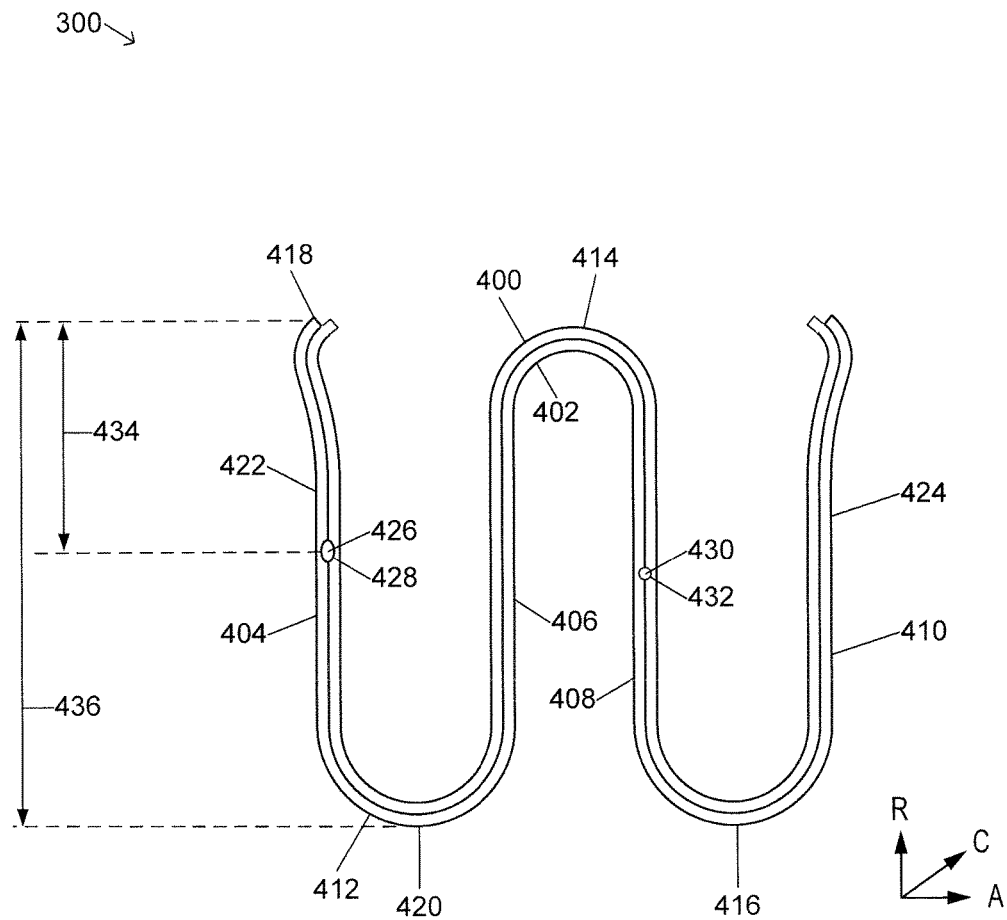
FIG. 4 is a drawing of the metal gasket bellows seal illustrated in FIG. 3, in accordance with various embodiments.

Turning now to FIG. 4, metal gasket bellows seal 300 has an inner diameter edge 420 and an outer diameter edge 418. Metal gasket bellows seal 300 also includes a first ply 400 and a second ply 402. First ply 400 defines at least a portion of outer diameter edge 418 and second ply 402 defines at least a portion of inner diameter edge 420. In various embodiments, first ply 400 may include the same material as second ply 402 and, in various embodiments, first ply 400 may include a different material than second ply 402.

Metal gasket bellows seal 300 also includes four legs including a first leg 404, a second leg 406, a third leg 408, and a fourth leg 410. First leg 404 and second leg 406 are separated by a first bend 412, second leg 406 and third leg 408 are separated by a second bend 414, and third leg 408 and fourth leg 410 are separated by a third bend 416. In various embodiments, a metal gasket bellows seal may include any number of legs and bends.

First leg 404 is positioned on a first axial end 422 of metal gasket bellows seal 300 and fourth leg 410 is positioned on a second axial end 424 of metal gasket bellows seal 300. In various embodiments, second axial and 424 may be aft of first axial end 422, and in various embodiments, first axial end 422 may be aft of second axial and 424.

Referring now to FIGS. 3 and 4, metal gasket bellows seal 300 may occasionally be subjected to stress from vane 202 and BOAS 208, as well as pressures and temperatures present in high pressure turbine section 34. It is undesirable for first ply 400 to move relative to second ply 402 while positioned in high pressure turbine section 34. Metal gasket bellows seal 300 may include a weld 426 at a first location 428 to resist movement of first ply 400 relative to second ply 402. As discussed below, metal gasket bellows seal 300 may include a slip joint designed to accommodate movement of one end of first ply 400 relative to the opposite end of second ply 402. Thus, movement of first ply 400 relative to second ply 402 may not be undesirable at the slip joint and gaps 511 and 509. Movement of first ply 400 relative to second ply 402 at locations other than those previously described may be undesirable as it may reduce the integrity of the metal gasket bellows seal 300.

Weld 426 may be formed using spot joining, referring to the fact that the weld 426 is applied at a spot on the material. For example, weld 426 may be formed via a resistance weld, a laser weld, an electron beam weld, a gas tungsten arc weld, a metal inert gas weld, or brazing. In that regard, spot joining may include any variety of tack welding along with brazing or any other form of spot joining. In various embodiments, spot joining may not include temporary joining techniques such as glue that will evaporate in normal operating conditions. In order to form a resistance weld between first ply 400 and second ply 402, current is applied through first ply 400 and second ply 402 at first location 428, generating heat and fusing first ply 400 to second ply 402 at first location 428. In order to form a laser weld between first ply 400 and second ply 402, a laser beam is directed at first ply 400 and/or second ply 402 at first location 428, generating heat and fusing first ply 400 to second ply 402 at first location 428. In order to form an electron beam weld between first ply 400 and second ply 402, a beam of electrons is directed at first ply 400 and/or second ply 402 at first location 428, generating heat and fusing first ply 400 to second ply 402 at first location 428.

First location 428 may be on first leg 404 of metal gasket bellows seal 300. In various embodiments, weld 426 may be at any location on metal gasket bellows seal 300. It may be preferable for weld 426 to be positioned on a leg of metal gasket bellows seal 300 instead of on a bend, outer diameter edge 418, or inner diameter edge 420. This is because less stress may be applied to a leg than to another location.

In various embodiments, metal gasket bellows seal 300 may include a second weld 430 at a second location 432. Second weld 430 may also be formed via resistance welding, laser welding, or electron beam welding. In various embodiments, a second weld may be positioned at any location on metal gasket bellows seal 300, however, a weld on a leg of metal gasket bellows seal 300 may be preferable to a weld at another location.

In various embodiments, first location 428 may be positioned a first distance 434 from outer diameter edge 418. First distance 434 may be between 30 percent (30%) and 70% of a second distance 436 between outer diameter edge 418 and inner diameter edge 420, may be between 40% and 60% of second distance 436, may be between 45% and 55% of second distance 436, or may be about 50% of second distance 436. Where used in this context only, about refers to the referenced value plus or minus 3% of the referenced value. As distance 434 approaches 50% of distance 436, weld 426 may be subjected to less stress.

Figure 5A:
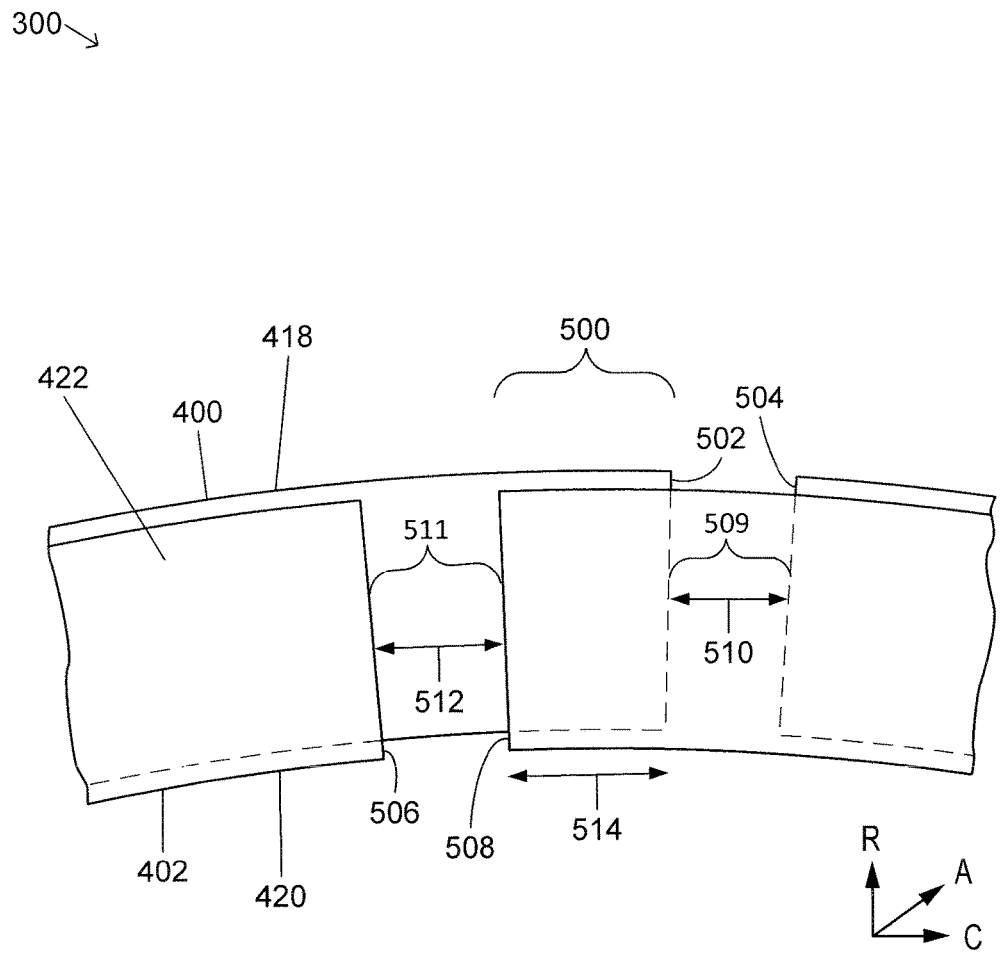
FIG. 5A is an axial view of a portion of the metal gasket bellows seal of FIG. 4, in accordance with various embodiments.

Turning now to FIG. 5A, an axial view of metal gasket bellows seal 300 illustrates features of a slip joint 500. In particular, first ply 400 includes a first ply first end 502 and a first ply second end 504. First ply first end 502 and first ply second end 504 are separated by a first gap 509 having a distance 510. Likewise, second ply 402 includes a second ply first end 506 and a second ply second end 508. Second ply first end 506 and second ply second end 508 are separated by a second gap 511 having a distance 512. Slip joint 500 is defined by the overlap of first ply first end 502 and second ply second end 508.

Figure 5B:
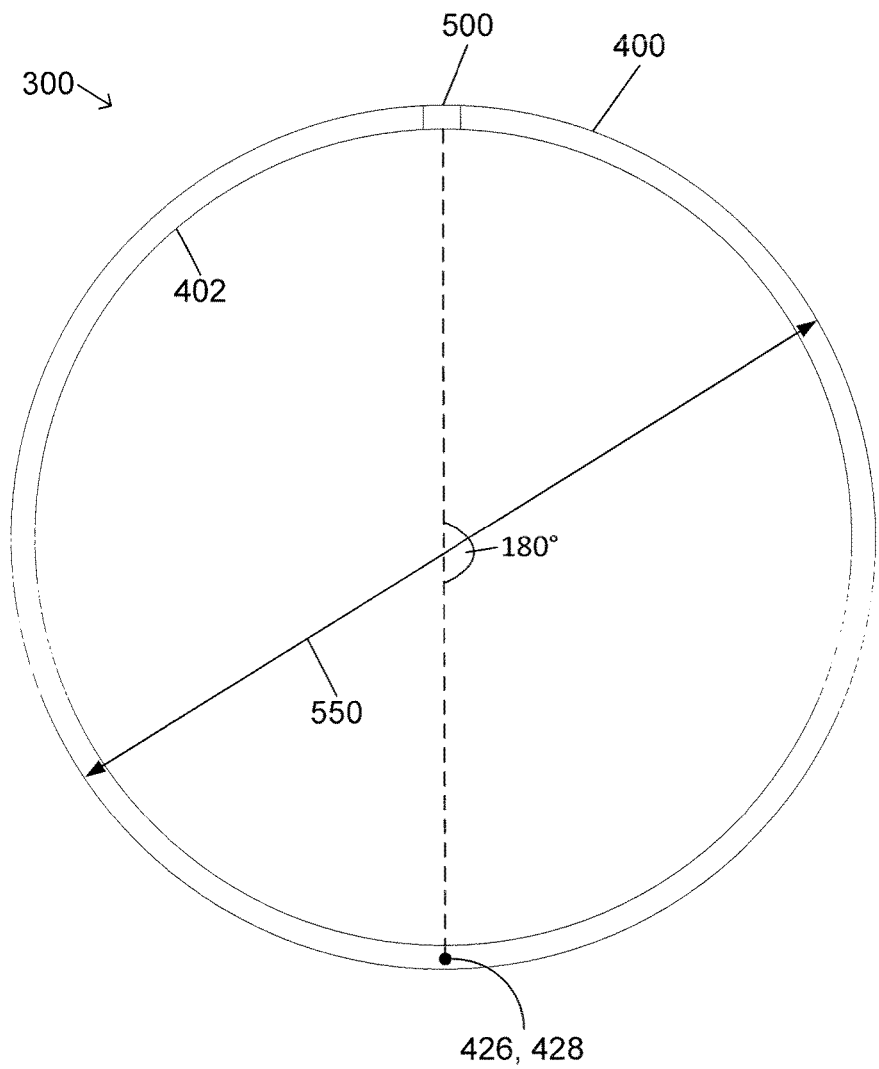
FIG. 5B is an axial view showing the entire circumference of the metal gasket bellows seal of FIG. 4, in accordance with various embodiments.
Figure 5B:
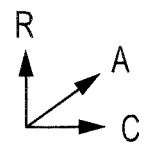

First gap 509 and second gap 511 allow movement of first ply 400 relative to second ply 402. Referring to FIGS. 3, 5A, and 5B, during operation of high pressure turbine section 34, a diameter 550 of metal gasket bellows seal 300 may vary based on relative movement of vane 202 and BOAS 208, as well as pressures within high pressure turbine section 34. First gap 509 and second gap 511 desirably allow this change in diameter 550 of metal gasket bellows seal 300. An overlap 514 of first ply 400 and second ply 402 further allows the change in diameter 550 of metal gasket bellows seal 300. Thus, it is undesirable for first ply 400 to be welded to second ply 402 at slip joint 500.

In various embodiments, first location 428 of weld 426 may be at any location along metal gasket bellows seal 300 other than at slip joint 500. In various embodiments, it may be desirable for first location 428 to be at a location between 150 degrees and 210 degrees from slip joint 500, between 160 degrees and 200 degrees from slip joint 500, between 170 degrees and 190 degrees from slip joint 500, or about 180 degrees from slip joint 500. Where used in this context only, about refers to the referenced value plus or minus 3% of the referenced value. By placing weld 426 at first location 428 that is 180 degrees from slip joint 500, any relative movement between first ply 400 and second ply 402 at locations other than slip joint 500 is reduced. Stated differently, relative growth on either side of weld 426 will be approximately the same because each side will have a similar amount of material allowed to expand. This may be desirable when first ply 400 includes a different material than second ply 402, as first ply 400 may include a different coefficient of thermal expansion than second ply 402.

In various embodiments and referring to FIGS. 1, 4, 5A, and 5B, metal gasket bellows seal 300 may be manufactured in a first location and at least a portion of gas turbine engine 2 that includes metal gasket bellows seal 300 may be assembled in a second location that is different than the first location. In that regard, first ply first end 502 and first ply second end 504 may move relative to each other during transportation. Likewise, second ply first end 506 and second ply second end 508 may move relative to each other during transportation or handling. Thus, diameter 550 of metal gasket bellows seal 300 may be undesirably changed during transportation.

Figure 6:
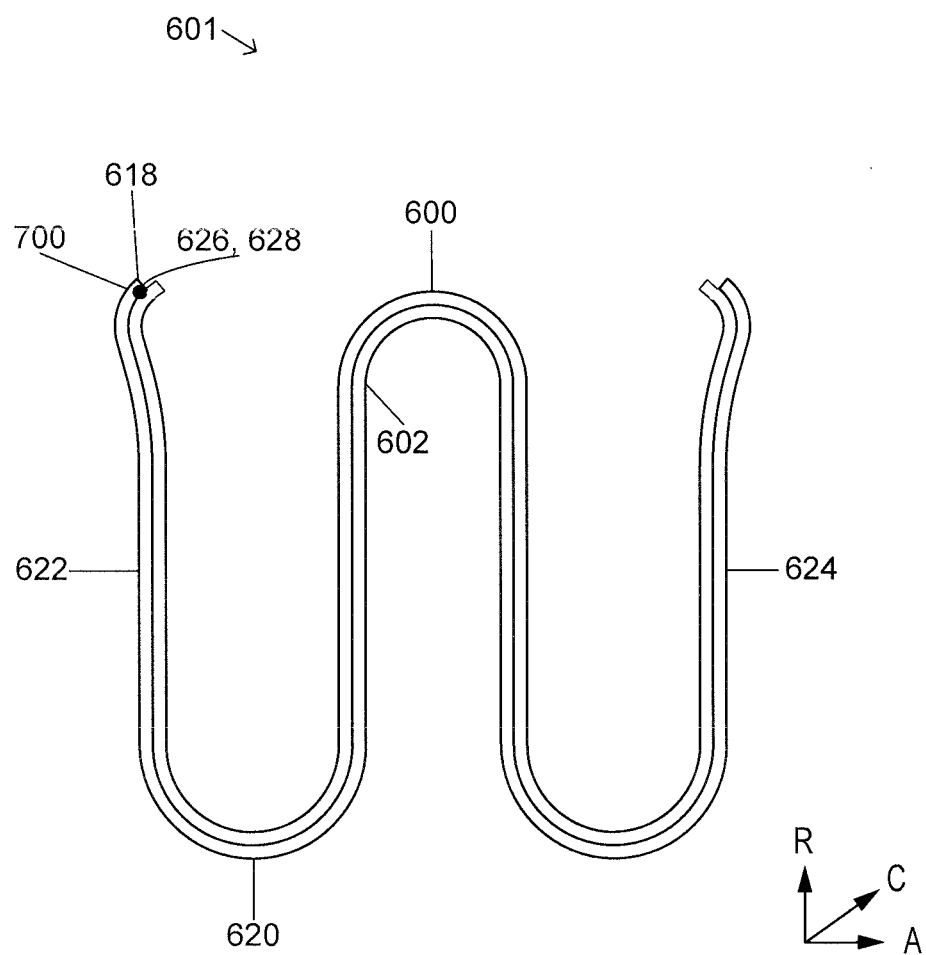
FIG. 6 is a drawing of a metal gasket bellows seal, in accordance with various embodiments.
Figure 7A:
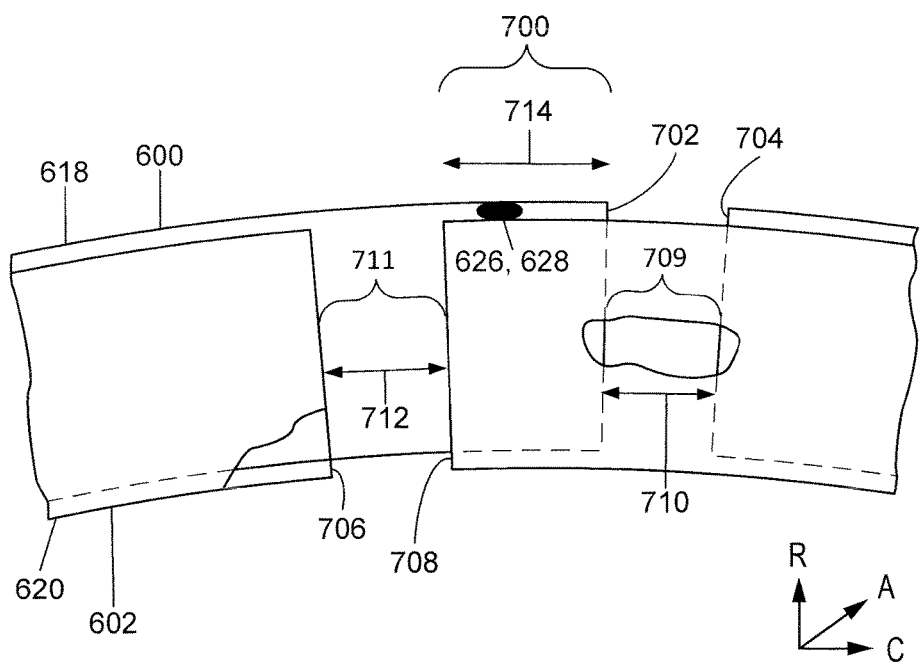
FIG. 7A is an axial view of a portion of the metal gasket bellows seal of FIG. 6, in accordance with various embodiments.
Figure 7B:
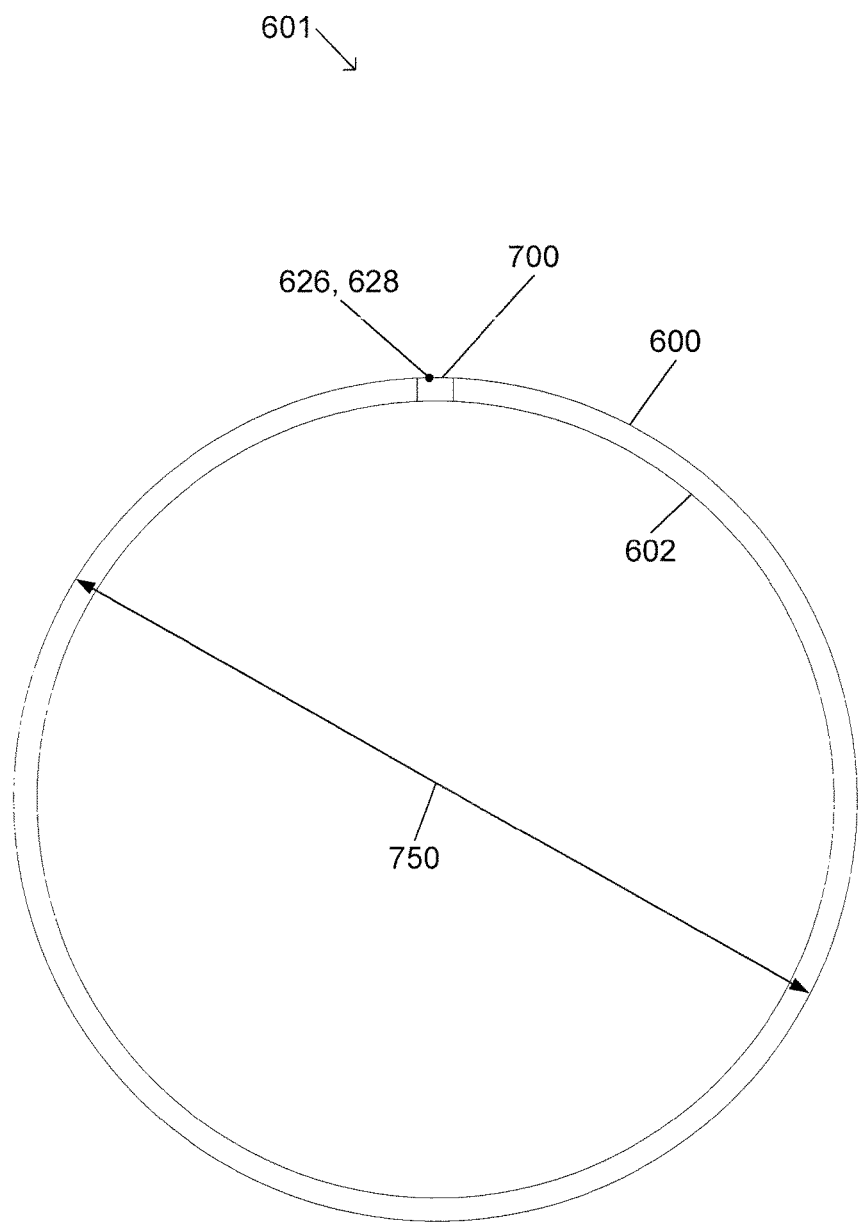
FIG. 7B is an axial view showing the entire circumference of the metal gasket bellows seal of FIG. 6, in accordance with various embodiments.
Figure 7B:
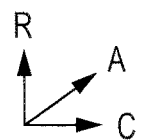

In order to reduce the likelihood of a metal gasket bellows seal being inadvertently adjusted during transportation and referring to FIGS. 6, 7A, and 7B, a metal gasket bellows seal 601 may have a first ply 600, a second ply 602, and adhesive 626 at a location 628 along a slip joint 700. Metal gasket bellows seal 601 may have an inner diameter edge 620, an outer diameter edge 618, a first axial end 622, and a second axial end 624. In various embodiments, first axial end 622 may be forward of second axial end 624 and, in various embodiments, first axial end 622 may be aft of second axial end 624.

In various embodiments, adhesive 626 may be applied after first ply 600 and second ply 602 have been placed together. In that regard, location 628 may be at outer diameter edge 618 of first axial end 622 or second axial end 624. In various embodiments, adhesive 626 may only be applied at one location of metal gasket bellows seal 601. In various embodiments, adhesive 636 may comprise one or more glues, epoxies, resins, and/or other suitable materials for adhering two surfaces together.

Referring now to FIGS. 7A and 7B, first ply 600 may have a first ply first end 702 and a first ply second end 704. First ply first end 702 and first ply second end 704 may be separated by a gap 709 having a distance 710. Likewise, second ply 602 may have a second ply first end 706 and a second ply second end 708. Second ply first end 706 and second ply second end 708 may be separated by a gap 711 having a distance 712. Distance 710 and distance 712 may have the same value, may have similar values, or may have different values.

Slip joint 700 is defined as the circumferential overlap of first ply first end 702 and second ply second end 708. Slip joint 700 may have a distance 714. In various embodiments, distance 714 may be between 0.05 inches (1.27 millimeters, mm) and 2 inches (50.8 mm), or between 0.4 inches (10.2 mm) and 1 inch (25.4 mm), or between 0.5 inches (12.7 mm) and 1 inch (25.4 mm).

FIG. 7A illustrates that a location 628 where adhesive 626 is applied is at outer diameter edge 618 of slip joint 700. In various embodiments, adhesive 626 may be applied at inner diameter edge 620 of slip joint 700 or at any other location of slip joint 700.

Because it is desirable for first ply first end 702 and first ply second end 704 to be able to move relative to each other during engine operation, and for second ply first end 706 and second ply second end 708 to be able to move relative to each other during use, it is undesirable for adhesive 626 to resist movement of first ply 600 relative to second ply 602 during use of metal gasket bellows seal 601. Because metal gasket bellows seal 601 may be used in a gas turbine engine such as gas turbine engine 2 of FIG. 1, metal gasket bellows seal 601 may be exposed to relatively high temperatures. In that regard, adhesive 626 may melt and change to a gaseous state at a temperature that is less than an operating temperature of the environment of metal gasket bellows seal 601. Stated differently, adhesive 626 may have a melting temperature that is less than an operating temperature of the environment of metal gasket bellows seal 601.

Referring to FIGS. 1 and 7A, metal gasket bellows seal 601 may be used in any portion of gas turbine engine 2, such as compressor section 6, combustor section 8, or turbine section 10. For example, metal gasket bellows seal 601 may be used in high pressure turbine section 34 of gas turbine engine 2. In that regard, metal gasket bellows seal 601 may be exposed to temperatures between 800 degrees Fahrenheit and 1500 degrees Fahrenheit (427 degrees Celsius and 649 degrees Celsius). When used in this type of environment, adhesive 626 may have a melting temperature that is between 400 degrees Fahrenheit and 600 degrees Fahrenheit (204 degrees Celsius and 316 degrees Celsius). Thus, when gas turbine engine two is first initialized, such as during a "green run," temperatures within high pressure turbine section 34 will exceed the melting temperature of adhesive 626, thus causing adhesive 626 to melt, allowing movement of first ply 600 relative to second ply 602 at slip joint 700. A "green run" may be a first initialization of gas turbine engine 2. Furthermore, if metal gasket bellows seal 601 is used in high pressure compressor section 34, temperatures may be sufficiently great to vaporize most adhesives prior to relative motion of any components being desirable.

Figure 8:
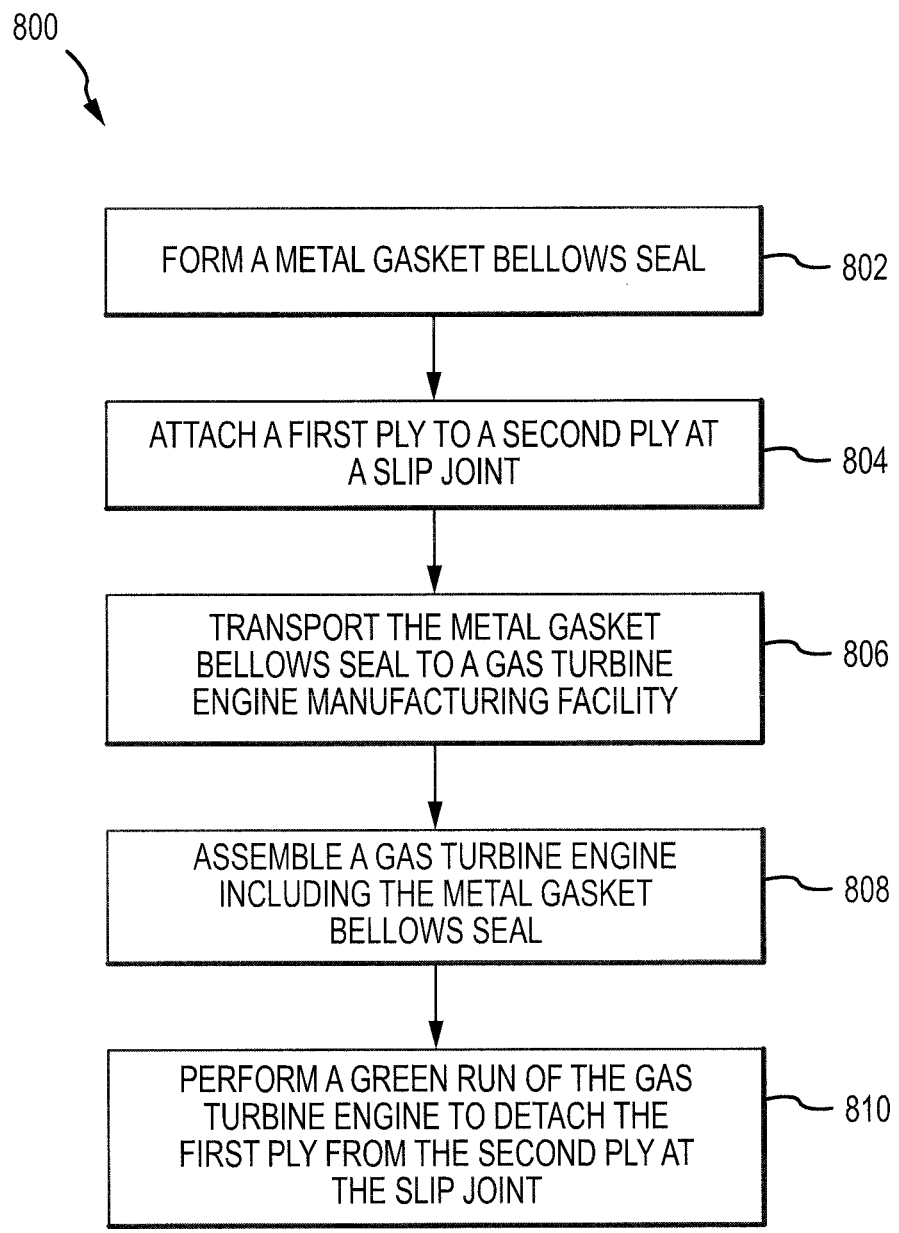
FIG. 8 is a flowchart illustrating a method for assembly of a gas turbine engine that includes a metal gasket bellows seal, in accordance with various embodiments.

Turning now to FIG. 8, a method 800 for manufacturing a gas turbine engine is shown. In block 802, a metal gasket bellows seal is formed. The metal gasket bellows seal may include any number of plies.

In block 804, the first ply may be attached to the second ply at the slip joint. For example, adhesive may be placed on the slip joint at a location at which it will contact the first ply and the second ply and resist movement of the first ply relative to the second ply.

In block 806, the metal gasket bellows seal may be transported to a facility at which the gas turbine engine will be manufactured and/or assembled. The attachment at the slip joint via adhesive may prevent a diameter of the metal gasket bellows seal from changing during this transportation.

In block 808, the gas turbine engine may be assembled. This assembly may include placing the metal gasket bellows seal in place within a turbine section or a compressor section of the gas turbine engine.

In block 810, the gas turbine engine may be initialized during a green run. As the environment of the metal gasket bellows seal increases in temperature, the adhesive may melt, thus allowing the first ply to move relative to the second ply as intended by the slip joint.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metal gasket bellows seal comprising:
   a first ply being annular and having a first ply first end and a first ply second end separated from the first ply first end by a first distance;
   a second ply being annular, located radially inward from the first ply, and having a second ply first end and a second ply second end separated from the second ply first end by a second distance such that a slip joint is formed by a circumferential overlap of the first ply first end and the second ply second end; and
   an adhesive,
   wherein:
      the first ply and the second ply have a cross-sectional shape that resembles a "W" and includes an inner diameter edge, an outer diameter edge, and at least one leg extending from the inner diameter edge to the outer diameter edge and having a leg distance,
      the second ply is coupled to the first ply at a first location along one of the at least one leg that is between 40 percent and 60 percent of the leg distance from the outer diameter edge via spot joining to form a spot weld,
      the slip joint is located at the outer diameter edge,
      the second ply is coupled to the first ply via the adhesive at the slip joint, and
      the first location is positioned between 150 degrees and 210 degrees from the slip joint.

2. The metal gasket bellows seal of claim 1, wherein the second ply is coupled to the first ply at multiple locations via the spot joining.

3. The metal gasket bellows seal of claim 1, wherein the spot joining includes at least one of resistance welding, laser welding, electron beam welding, gas tungsten arc welding, metal inert gas welding, or brazing.

4. The metal gasket bellows seal of claim 1, wherein the first location is positioned on a first leg of the metal gasket bellows seal that is located at a first axial end of the metal gasket bellows seal.

5. A metal gasket bellows seal comprising:
   a first ply being annular and having a first ply first end and a first ply second end separated by a first distance;
   a second ply being annular, located radially inward from the first ply, and having a second ply first end and a second ply second end separated by a second distance such that a slip joint is formed by a circumferential overlap of the first ply first end and the second ply second end; and
   an adhesive,
   wherein:
      the first ply and the second ply have a cross-sectional shape that resembles a "W" having an inner diameter edge and an outer diameter edge and including at least one leg extending from the inner diameter edge to the outer diameter edge and having a leg distance,
      the second ply is coupled to the first ply at a first location along one of the at least one leg that is between 40 percent and 60 percent of the leg distance from the outer diameter edge via spot joining to form a spot weld,
      the second ply is coupled to the first ply via the adhesive at the outer diameter edge, and
      the first location is positioned between 150 degrees and 210 degrees from the slip joint.

6. The metal gasket bellows seal of claim 5, wherein the adhesive is configured to melt at a melting temperature that is less than an operating temperature of an environment of the metal gasket bellows seal.

7. The metal gasket bellows seal of claim 6, wherein the operating temperature of the environment of the metal gasket bellows seal is between 800 degrees Fahrenheit and 1500 degrees Fahrenheit and the melting temperature is between 400 degrees Fahrenheit and 600 degrees Fahrenheit.

8. The metal gasket bellows seal of claim 5, wherein the adhesive resists an increase or decrease in a diameter of the metal gasket bellows seal during at least one of transportation or handling of the metal gasket bellows seal.

9. The metal gasket bellows seal of claim 5, wherein the adhesive is applied to the metal gasket bellows seal at a single location.

10. The metal gasket bellows seal of claim 5, wherein the spot joining includes at least one of resistance welding, laser welding or electron beam welding.

11. A method for manufacturing a seal for use with a gas turbine engine, comprising:
   forming a metal gasket bellows seal that includes:
      a first ply being annular and having a first ply first end and a first ply second end separated from the first ply first end by a first distance, and
      a second ply being annular, located radially inward from the first ply, and having a second ply first end and a second ply second end separated from the second ply first end by a second distance such that a slip joint is formed by a circumferential overlap of the first ply first end and the second ply second end, wherein:
   the first ply and the second ply have a cross-sectional shape that resembles a "W" and includes an inner diameter edge, an outer diameter edge, and at least one leg extending from the inner diameter edge to the outer diameter edge and having a lea distance,
   the slip joint is located at the outer diameter edge, and
   the first location is positioned between 150 degrees and 210 degrees from the slip joint;
coupling the second ply to the first ply at a first location along one of the at least one leg that is between 40 percent and 60 percent of the leg distance from the outer diameter edge via spot joining to form a spot weld; and
attaching the first ply to the second ply at the slip joint via an adhesive.

12. The method of claim 11, wherein the adhesive is configured to melt at a melting temperature that is less than an operating temperature of an environment of the metal gasket bellows seal.

13. The method of claim 12, further comprising performing a green run of the gas turbine engine to melt the adhesive.

14. The method of claim 11, further comprising transporting the metal gasket bellows seal to a location for assembly of the gas turbine engine, wherein the adhesive resists an increase or a decrease of a diameter of the metal gasket bellows seal during the transporting the metal gasket bellows seal to the location for assembly of the gas turbine engine.

15. The method of claim 11, wherein the adhesive is located at an outer diameter edge of the metal gasket bellows seal or at an inner diameter edge of the metal gasket bellows seal.

* * * * *